(12) United States Patent
Zhang

(10) Patent No.: US 10,663,924 B2
(45) Date of Patent: May 26, 2020

(54) DISPLAY DEVICE AND METHOD FOR REALIZING HOLOGRAPHIC DISPLAY BY THE SAME

(71) Applicant: BOE TECHNOLOGY GROUP CO., LTD., Beijing (CN)

(72) Inventor: Yuxin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 200 days.

(21) Appl. No.: 15/742,931

(22) PCT Filed: Jun. 21, 2017

(86) PCT No.: PCT/CN2017/089354
§ 371 (c)(1),
(2) Date: Jan. 9, 2018

(87) PCT Pub. No.: WO2018/040682
PCT Pub. Date: Mar. 8, 2018

(65) Prior Publication Data
US 2019/0079451 A1    Mar. 14, 2019

(30) Foreign Application Priority Data
Aug. 31, 2016 (CN) .......................... 2016 1 0799399

(51) Int. Cl.
*G03H 1/22* (2006.01)
*G02B 30/27* (2020.01)
(Continued)

(52) U.S. Cl.
CPC ........... *G03H 1/2294* (2013.01); *G02B 30/27* (2020.01); *G03H 1/2205* (2013.01); *G06F 3/013* (2013.01);
(Continued)

(58) Field of Classification Search
CPC ......... G03H 1/2294; G03H 2001/2242; G03H 2222/34; H04N 13/302; G06F 3/013
See application file for complete search history.

(56) References Cited

U.S. PATENT DOCUMENTS 8,462,408 B2   6/2013  Kroll et al.
8,462,409 B2   6/2013  Olaya
(Continued)

FOREIGN PATENT DOCUMENTS

CA        2688827 A1    11/2008
CN      101681146 A     3/2010
(Continued)

OTHER PUBLICATIONS

Search Report and Written Opinion for International Application No. PCT/CN2017/089354 dated Sep. 29, 2017.

*Primary Examiner* — Mishawn N. Hunter
(74) *Attorney, Agent, or Firm* — Calfee, Halter & Griswold LLP

(57) ABSTRACT

A display device and a method for realizing holographic display by the same are disclosed. The first lens array includes a plurality of first lenses arranged in an array, and the first lenses correspond to a plurality of viewing areas disposed on the light emitting path respectively; the array of slits includes a plurality of slits which are arranged in an array and disposed in one-to-one correspondence with the first lenses; the spatial light modulator loads a holographic image; the eye-tracking device tracks the location of human eye; and after determining a viewing area according to the location of human eye, the controller controls the deflecting member to emit light emitted from the spatial light modulator to the slit corresponding to the first lens which corresponds to the viewing area, and controls a deflection angle of the first lens.

11 Claims, 2 Drawing Sheets

(51) Int. Cl.
*H04N 13/302* (2018.01)
*G06F 3/01* (2006.01)

(52) U.S. Cl.
CPC ..... *H04N 13/302* (2018.05); *G03H 2001/221* (2013.01); *G03H 2001/2242* (2013.01); *G03H 2222/34* (2013.01); *G03H 2223/12* (2013.01); *G03H 2223/17* (2013.01); *G03H 2223/19* (2013.01); *G03H 2226/05* (2013.01)

(56) References Cited

U.S. PATENT DOCUMENTS

| | | |
|---|---|---|
| 8,958,137 B2 | 2/2015 | Haussler |
| 9,253,475 B2 | 2/2016 | Itoh |
| 9,291,828 B2 | 3/2016 | Kroll et al. |
| 2004/0046861 A1* | 3/2004 | Ramanujan ............... B41J 2/465 347/239 |
| 2010/0033782 A1 | 2/2010 | Olaya |
| 2010/0103485 A1 | 4/2010 | Haussler |
| 2010/0214634 A1 | 8/2010 | Kroll et al. |
| 2011/0149018 A1 | 6/2011 | Kroll et al. |
| 2013/0093861 A1 | 4/2013 | Itoh |
| 2014/0016051 A1 | 1/2014 | Kroll et al. |
| 2015/0286187 A1* | 10/2015 | Collings ............... G03H 1/0808 359/9 |
| 2016/0202593 A1 | 7/2016 | Kroll et al. |

FOREIGN PATENT DOCUMENTS

| | | |
|---|---|---|
| CN | 102959457 A | 3/2013 |
| CN | 103384854 A | 11/2013 |
| CN | 104076516 A | 10/2014 |
| CN | 104618706 A | 5/2015 |
| EP | 2084580 A1 | 8/2009 |
| EP | 2089777 A1 | 8/2009 |
| WO | 2008049912 A1 | 5/2008 |
| WO | 2008049917 A1 | 5/2008 |

* cited by examiner

DISPLAY DEVICE AND METHOD FOR REALIZING HOLOGRAPHIC DISPLAY BY THE SAME

CROSS-REFERENCE

The present application is based upon international Application No. PCT/CN2017/089354, filed on Jun. 21, 2017, which claims priority to Chinese Patent Application No. 201610799399.3, filed on Aug. 31, 2016, and the entire contents thereof are incorporated herein by reference.

TECHNICAL FIELD

The present disclosure relates to a field of holographic display technology, particularly, to a display device and a method for realizing holographic display by the same.

BACKGROUND

Holographic display technology is a display technology that records and reproduces a real three-dimensional (3D) image of an object by use of interference and diffraction. This technology is capable of displaying all the information of the object from each angle thereof and is considered to be the final scheme for realizing 3D display. The holographic display technology may be classified into static holographic display technology and dynamic holographic display technology. The static holographic display technology is basically mature and commonly used in exhibition, advertisement or the like. Although the dynamic holographic display technology is still in the research stage, it has a wide application prospect and has become the hot issue for research in the field of holographic and three-dimensional display. Currently, the dynamic display of liquid crystal on silicon display is the main direction of research for realizing dynamic holographic display.

As is well-known, compared with the parallax stereoscopic display technology, the holographic reproduction technology has advantages such as large depth of field and no dizziness the like. However, the development of holographic reproduction technology, especially video holographic reproduction technology, is restricted by hardware requirement. For the technology, on the one hand, a spatial light modulator with a relatively high resolution is required, on the other hand, the data processing system is required to perform a large number of operations quickly. A large wavefront viewing area may be formed in the traditional computer-generated hologram displayed technology; however, in the wavefront viewing area, in addition to the area outside the two windows into the pupilla, the remaining areas cannot be viewed and the information thereof is wasted.

SUMMARY

Embodiments of the present disclosure provide a display device and a method for realizing holographic display by the same.

An embodiment of the present disclosure provides a display device, including: a light source; a spatial light modulator, a deflecting member, an array of slits and a first lens array which are disposed on a light emitting path of the light source in sequence; an eye-tracking device for tracking a location of human eye; and a controller, wherein the first lens array includes a plurality of first lenses which are arranged in an array successively, and each of the plurality of first lenses corresponds to a corresponding one of a plurality of viewing areas disposed on the light emitting path respectively, wherein the array of slits includes a plurality of slits which are arranged in an array and disposed in one-to-one correspondence with the plurality of first lenses, wherein the spatial light modulator is configured to load a holographic image, wherein the controller is configured to, after determining the viewing area corresponding to the location of human eye according to the location of human eye, control the deflecting member to emit light emitted from the spatial light modulator to the slit corresponding to the first lens which corresponds to the viewing area, and control a deflection angle of the first lens such that the light emitted from the first lens is converged to the location of human eye.

In a possible implementation, in the above display device provided by the embodiment of the present disclosure, each of the plurality of first lenses is a liquid crystal lens or an optical convex lens.

In a possible implementation, in the above display device provided by the embodiment of the present disclosure, each of the plurality of first lenses is an optical convex lens, and the display device further includes rotation members disposed in one-to-one correspondence with the optical convex lenses, wherein the rotation member is configured to receive an electrical signal which is sent by the controller to control an angle by which the corresponding first lens is deflected.

In a possible implementation, in the above display device provided by the embodiment of the present disclosure, the display device further includes a second lens array disposed between the deflecting member and the array of slits, and the second lens array includes a plurality of second lenses which are disposed in one-to-one correspondence with the plurality of slits, and each of the plurality of second lenses is configured to converge and then emit the light emitted from the deflecting member to the corresponding slit.

In a possible implementation, in the above display device provided by the embodiment of the present disclosure, the second lens array is in contact with the array of slits and is spaced apart from the deflecting member by a predetermined distance.

In a possible implementation, in the above display device provided by the embodiment of the present disclosure, the light source is a light emitting diode.

In a possible implementation, in the above display device provided by the embodiment of the present disclosure, the light source includes a laser source and an expanding collimator lens disposed on a light emitting path of the laser source.

In a possible implementation, in the above display device provided by the embodiment of the present disclosure, the eye-tracking device is a camera or an eye-tracker.

In a possible implementation, in the above display device provided by the embodiment of the present disclosure, the spatial light modulator is a liquid crystal spatial light modulator.

In a possible implementation, in the above display device provided by the embodiment of the present disclosure, the liquid crystal spatial light modulator is a liquid crystal on silicon (LCOS) display device.

Another embodiment of the present disclosure provides a method for realizing holographic display by the above display device, including: by the eye-tracking device, tracking the location of human eye; and by the controller, after determining the viewing area corresponding to the location of human eye according to the location of human eye, controlling the deflecting member to emit light emitted from the spatial light modulator after loading the holographic image to the slit corresponding to the first lens which corresponds to the viewing area, and controlling the deflection angle of the first lens such that the light emitted from the first lens is converged to the location of human eye.

DETAILED DESCRIPTION

Figure 1:
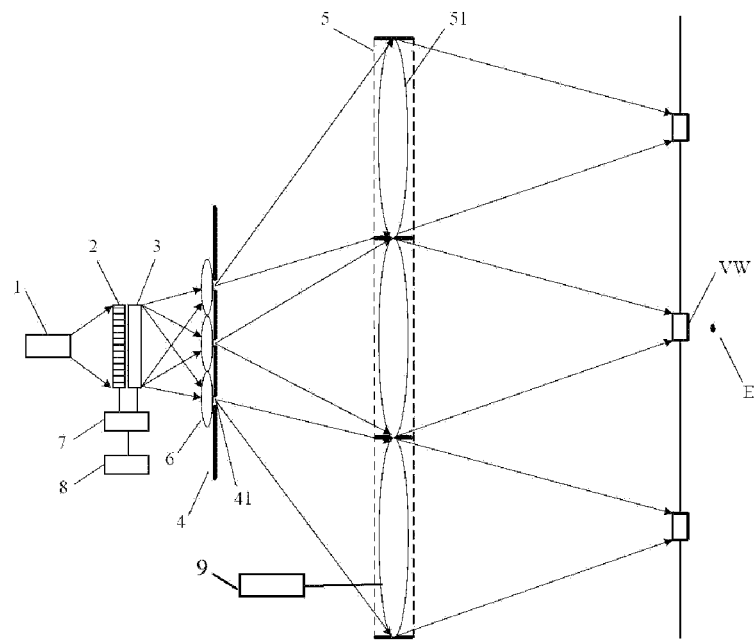
FIG. 1 is a schematic diagram illustrating a structure of a display device according to an embodiment of the present disclosure.

Hereinafter, the implementations of the display device and the method for realizing holographic display according to embodiments of the present disclosure will be described in detailed in conjunction with the drawings.

In the drawings, the shapes and the sizes of the parts do not represent the real proportion of the display device, which is only for exemplary illustration of the present disclosure.

Figure 2:
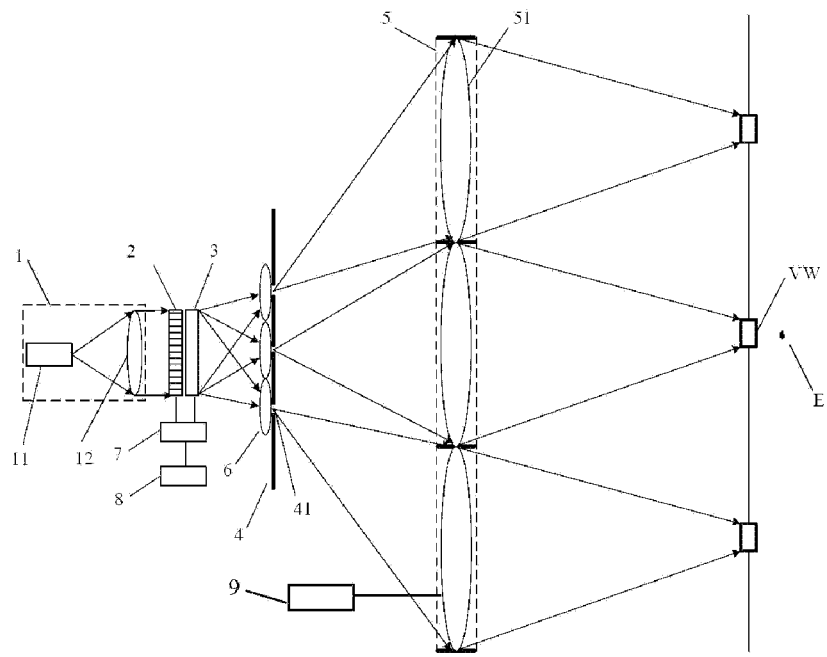
FIG. 2 is a schematic diagram illustrating a structure of a display device according to another embodiment of the present disclosure.
Figure 3:
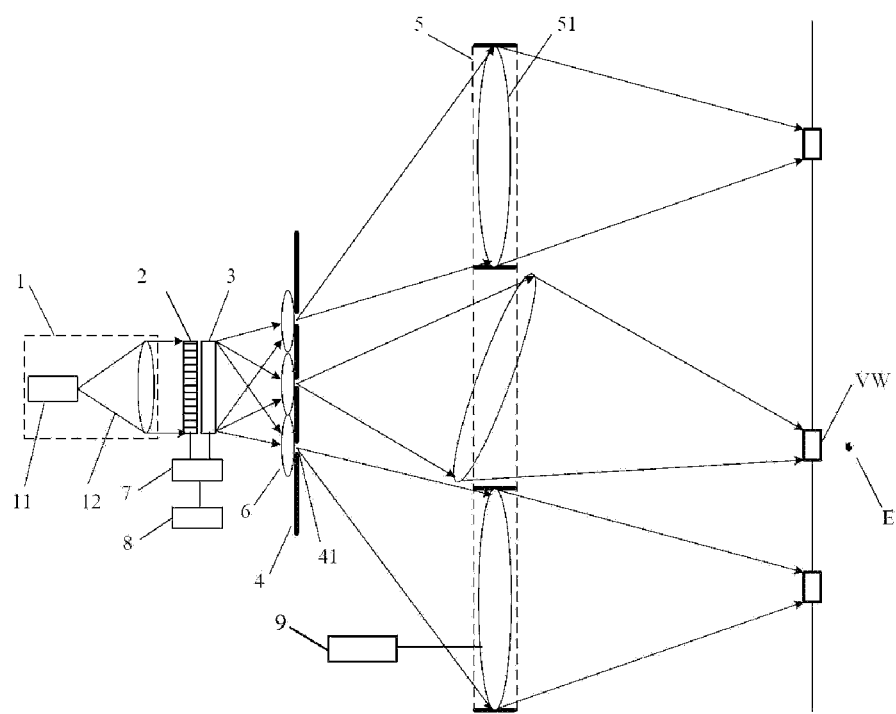
FIG. 3 is a schematic diagram illustrating a structure of a display device according to still another embodiment of the present disclosure.

As shown in FIGS. 1 to 3, the display device provided by the embodiment of the present disclosure includes: a light source 1; a spatial light modulator 2, a deflecting member 3, an array 4 of slits and a first lens array 5 which are disposed on a light emitting path of the light source 1 in sequence; an eye-tracking device 8 for tracking a location of human eye E; and a controller 7.

Figure 4:
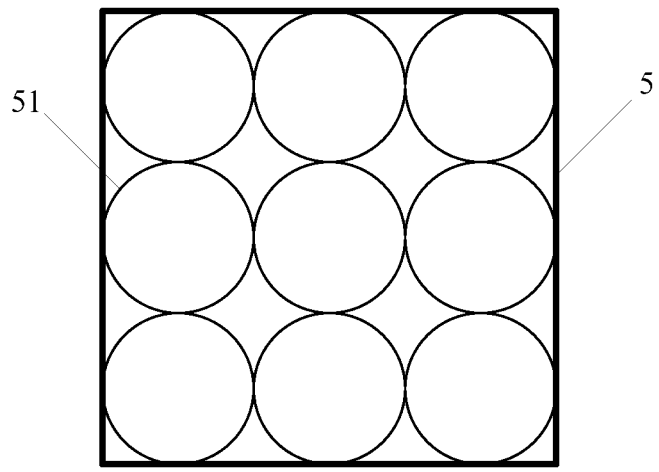
FIG. 4 is a top view illustrating a structure of a first lens array according to an embodiment of the present disclosure.

The first lens array 5 includes a plurality of first lenses 51 which are arranged in an array successively, for example, as shown in FIG. 4, the respective first lenses 51 are arranged in a 3×3 array. Each of the first lenses 51 corresponds to one of a plurality of viewing areas VW disposed on the light emitting path respectively.

The array 4 of slits includes a plurality of slits 41 which are arranged in an array and disposed in one-to-one correspondence with the first lenses 51.

The spatial light modulator 2 is used for loading a holographic image.

The controller 7 is used for, after determining the viewing area VW corresponding to the location of human eye E according to the location of human eye E, controlling the deflecting member 3 to emit light emitted from the spatial light modulator 2 to the slit 41 corresponding to the first lens 51 which corresponds to the viewing area VW, and control a deflection angle of the first lens 51 such that the light emitted from the first lens 51 is converged to the location of human eye E.

In the above display device provided by the embodiment of the present disclosure, since the controller 7 may control the first lens 51 to be deflected in various angles according to the location of human eye E so as to accurately converge the holographic image to the location of human eye E, the problem of viewing angle being limited in the holographic window technology is overcome. It is noted that, in the above display device provided by the embodiment of the present disclosure, the eye-tracking device 8 may simultaneously track locations of eyes E of more than one person, and the controller 7 controls a plurality of corresponding first lenses 51 to be deflected according to the locations of the eyes E of the more than one person, such that the holographic image is accurately converged to the locations of the eyes E of the more than one person, thereby the effect of which the holographic image can be viewed by more than one person can be realized.

During implementation, in the above display device provided by the embodiment of the present disclosure, each of the first lenses 51 may be a liquid crystal lens or an optical convex lens, in order to converge the light emitted from the slits 41 disposed in one-to-one correspondence with the first lenses 51 to the viewing area VW.

When the first lens 51 is the liquid crystal lens, the controller 7 may adjust the focal length and deflection angle of the equivalent convex lens formed by the liquid crystal lens according to the applied voltage of the liquid crystal lens, such that the light emitted from the liquid crystal lens is converged to the location of human eye E.

When the first lens 51 is the optical convex lens, in order to control the deflection angle of the optical convex lens, the above display device provided by the embodiment of the present disclosure may further include rotation members 9 disposed in one-to-one correspondence with the optical lenticular lenses. The rotation member 9 is used for receiving an electrical signal which is sent by the controller 7 to control an angle by which the first lens 51 is deflected. As such, when the electrical signal is received by the rotation member 9, the rotation member 9 may allow the optical convex lens to be deflected by a predetermined angle, thereby the light is converged to the location of human eye E.

During implementation, in order to allow the light emitted from the deflecting member 3 to be emitted into the desired slit 41, as shown in FIGS. 1-3, the above display device provided by the embodiment of the present disclosure may further include a second lens array 6 disposed between the deflecting member 3 and the array 4 of slits. The second lens array 6 includes a plurality of second lenses which are disposed in one-to-one correspondence with the slits 41, and each of the second lenses is used for converging and then emitting the light emitted from the deflecting member 3 to the corresponding slit 41. The second lens array 6 may allow the light from the deflecting member 3 to be converged into the array 4 of slits, and the array 4 of slits may prevent high diffraction orders without limitation on a selected diffraction order, thus the crosstalk may be avoided. The respective second lens in the second lens array 6 may converge the light emitted from the deflecting member 3 to the slits 41.

During implementation, in the above display device provided by the embodiment of the present disclosure, as shown in FIGS. 1-3, the second lens array 6 preferably may be in contact with the array 4 of slits and is spaced apart from the deflecting member 3 by a predetermined distance. Such arrangement may allow the light emitted from the deflecting member 3 to be converged to the array 4 of slits by the second lens array 6 to the maximum extent.

During implementation, in the above display device provided by the embodiment of the present disclosure, in order to allow the light with the holographic image to be deflect to the corresponding slit 41 effectively, the deflecting member 3 may include an optical component which may adjust focal length and light deflection orientation, particularly, the deflecting member 3 may be a liquid crystal lens. During implementation, in the above display device provided by the embodiment of the present disclosure, in order to provide the spatial light modulator 2 with a large amount of light, as shown in FIG. 1, the light source 1 may be a light emitting diode; or as shown in FIG. 2, the light source 1 may also be a laser source 11, and in this case, an expanding collimator lens 12 is required to be disposed on a light emitting path of the laser source 11.

During implementation, in the above display device provided by the embodiment of the present disclosure, in order to track the location of human eye E in real time, the eye-tracking device 8 may be a camera or an eye-tracker.

During implementation, in the above display device provided by the embodiment of the present disclosure, the spatial light modulator 2 may be a liquid crystal spatial light modulator, for example, a liquid crystal on silicon (LCOS) display device or the like, however the present disclosure is not limited thereto. Liquid crystal on silicon may refresh the loaded holographic image information quickly, such that the holographic image with smooth picture and less flicker can be obtained and dynamic holographic display can be realized.

Base on the same inventive concept, an embodiment of the present disclosure further provides a method for realizing holographic display, which includes the following steps.

The eye-tracking device 8 tracks a location of human eye E.

After determining the viewing area VW corresponding to the location of human eye E according to the location of human eye E, the controller 7 controls the deflecting member 3 to emit light emitted from the spatial light modulator 2 after loading the holographic image to the slit 41 corresponding to the first lens 51 which corresponds to the viewing area VW, and controls the deflection angle of the first lens 51 such that the light emitted from the first lens 51 is converged to the location of human eye E.

During implementation, in the above method provided by the embodiment of the present disclosure, after receiving the location information of human eye sent by the eye-tracking device 8, the controller 7 firstly determines the viewing area corresponding to the location of human eye, and then, maintains the current state of the first lens if it is determined that the location of human eye is located on the location where the emitted light of the first lens corresponding to the viewing area is converged, and adjusts the deflection angle of the first lens as shown FIG. 3 such that the emitted light of the first lens may be converged to the location of human eye, if it is determined that the location of human eye is not located on the location where the emitted light of the first lens is converged.

The present disclosure provides a display device and a method for realizing holographic display, in which the first lens array includes a plurality of first lenses which are successively arranged in an array, and the respective first lenses correspond to a plurality of viewing areas disposed on the light emitting path respectively; the array of slits includes a plurality of slits which are arranged in an array and disposed in one-to-one correspondence with the first lenses; the spatial light modulator is employed to load a holographic image; the eye-tracking device 8 is employed to track the location of human eye; and after determining a viewing area according to the location of human eye, the controller 7 is employed to control the deflecting member to emit light emitted from the spatial light modulator to the slit corresponding to the first lens which corresponds to the viewing area, and to control a deflection angle of the first lens such that the light emitted from the first lens is converged to the location of human eye. Since the controller may control the first lens to be deflected in various angles according to the location of human eye so as to accurately converge the holographic image to the location of human eye, the problem of viewing angle being limited in the holographic window technology is overcome.

It is obvious to those skilled in the art that various modifications and variations may be made without departing from the spirit and scope of the present disclosure. As such, the present disclosure intends to include such modifications and variations if the modifications and variations of the present disclosure fall into the scope of the appended claims and its equivalent technical solutions.

What is claimed is:

1. A display device, comprising:
a light source;
a spatial light modulator, a deflecting member, an array of slits and a first lens array, which are disposed on a light emitting path of the light source in sequence;
an eye-tracking device for tracking a location of human eye; and
a controller,
wherein the first lens array comprises a plurality of first lenses arranged in an array successively, and each of the plurality of first lenses corresponds to a corresponding one of a plurality of viewing areas disposed on the light emitting path respectively,
wherein the array of slits comprises a plurality of slits arranged in an array and disposed in one-to-one correspondence with the plurality of first lenses,
wherein the spatial light modulator is configured to load a holographic image,
wherein the controller is configured to, determine the viewing area corresponding to the location of human eye according to the location of human eye, control the deflecting member to emit light emitted from the spatial light modulator to the slit corresponding to the first lens which corresponds to the viewing area, and control a deflection angle of the first lens such that the light emitted from the first lens is converged to the location of human eye,
wherein each of the plurality of first lenses is an optical convex lens,
wherein the display device further comprises rotation members disposed in one-to-one correspondence with the optical convex lenses, and the rotation member is configured to receive an electrical signal which is sent by the controller to control an angle by which the corresponding first lens is deflected.

2. The display device according to claim 1, further comprising a second lens array disposed between the deflecting member and the array of slits,
wherein the second lens array comprises a plurality of second lenses which are disposed in one-to-one correspondence with the plurality of slits, and each of the plurality of second lenses is configured to converge and then emit the light emitted from the deflecting member to the corresponding slit.

3. The display device according to claim 2, wherein the second lens array is in contact with the array of slits and is spaced apart from the deflecting member by a predetermined distance.

4. The display device according to claim 2, wherein the light source is a light emitting diode.

5. The display device according to claim 2, wherein the light source comprises a laser source and an expanding collimator lens disposed on a light emitting path of the laser source.

6. The display device according to claim 1, wherein the light source is a light emitting diode.

7. The display device according to claim 1, wherein the light source comprises a laser source and an expanding collimator lens disposed on a light emitting path of the laser source.

8. The display device according to claim 1, wherein the eye-tracking device is a camera or an eye-tracker.

9. The display device according claim 1, wherein the spatial light modulator is a liquid crystal spatial light modulator.

10. The display device according to claim 9, wherein the liquid crystal spatial light modulator is a liquid crystal on silicon (LCOS) display device.

11. A method for realizing holographic display by the display device according to claim 1, comprising:
- by the eye-tracking device, tracking the location of human eye; and
- by the controller, determining the viewing area corresponding to the location of human eye according to the location of human eye, controlling the deflecting member to emit light emitted from the spatial light modulator after loading the holographic image to the slit corresponding to the first lens which corresponds to the viewing area, and controlling the deflection angle of the first lens such that the light emitted from the first lens is converged to the location of human eye.

* * * * *